United States Patent [19]

Callaway et al.

[11] Patent Number: 5,474,838

[45] Date of Patent: Dec. 12, 1995

[54] ROOFING MEMBRANE COMPRISING FIBERGLASS SCRIM STITCHED TO A POLYESTER MAT

[75] Inventors: Brian Callaway, Moore; Morris D. Moore, III, Spartanburg, both of S.C.

[73] Assignee: Milliken Research Corporation, Spartanburg, S.C.

[21] Appl. No.: 199,585

[22] Filed: Feb. 22, 1994

[51] Int. Cl.$^6$ ........................................................ B32B 3/06
[52] U.S. Cl. ............................ 428/102; 422/285; 422/287; 422/291
[58] Field of Search ..................................... 428/102, 236, 428/255, 285, 287, 291; 427/443, 299; 28/158

[56] References Cited

U.S. PATENT DOCUMENTS

| | | | |
|---|---|---|---|
| 4,450,196 | 5/1984 | Kamat | 428/197 |
| 4,491,617 | 1/1985 | O'Connor et al. | 428/236 |
| 4,539,254 | 9/1985 | O'Connor et al. | 428/236 |
| 4,615,934 | 10/1986 | Ellison | 428/254 |
| 4,762,744 | 8/1988 | Woiceshyn et al. | 428/219 |
| 4,780,350 | 10/1988 | O'Connor et al. | 428/109 |
| 5,108,831 | 4/1992 | Green | 428/291 |
| 5,151,146 | 9/1992 | Green | 156/177 |
| 5,194,320 | 3/1993 | Groshens | 428/230 |

*Primary Examiner*—Christopher W. Raimund
*Attorney, Agent, or Firm*—Terry T. Moyer; Earle R. Marden

[57] ABSTRACT

A roofing membrane having a reinforcing fabric saturated with a bituminous material. The reinforcing fabric having a first fiberglass scrim layer to which is stitched a non-woven polyester mat.

5 Claims, No Drawings

ROOFING MEMBRANE COMPRISING FIBERGLASS SCRIM STITCHED TO A POLYESTER MAT

The invention relates to a new and improved substrate for bituminous roofing membranes which are readily manufactured, flexible, capable of being impregnated by bituminous material and having sufficient strength to be useful in reinforcing roofing membranes.

Prior to this invention a single ply fiberglass scrim fabric laminated to a porous non-woven fiberglass mat was used as a substrate for a bituminous roofing member but was found to be lacking in directionally uniform strength and integrity. To overcome this problem and provide a membrane which can be readily manufactured with a minimum of processing steps and handling, the herein-disclosed bituminous roofing membrane was developed.

Therefore, it is an object of the invention to provide a two-ply substrate for bituminous roofing membrane which can be readily manufactured, is structurally strong and provides increased service life.

Other objects and advantages of the invention will become readily apparent as the specification proceeds to describe the invention.

In the manufacture of roofing membranes, a reinforcing sheet is saturated with bituminous material by leading the sheet through a tank or vat of bituminous material heated to about 275° to 425° F. (135° to 220° C.) using methods which are known in the art. This invention may also be utilized with cold mastics, i.e., materials which will not come into contact with hot coatings either in the coating process or during application to a roof. The resulting roofing membranes are rolled up for later installation, principally on flat roofs using additional bituminous material or a torch or other source of heat to seal the membrane and the joints. The bituminous material used in making these membranes is often a "modified bituminous" such as asphalt combined with about 20% by weight of static polypropylene or 5 to 15% styrene butadiene block copolymer rubber. This invention relates to a new form of composite sheet for use in reinforcing such membranes.

The reinforcing sheet of the new roofing substrate consists of a first layer of a fiberglass scrim fabric to which is stitched or knitted a second layer of non-woven polyester staple fibers on a Malimo or weft insertion machine with stitch through capability.

The first layer of this invention is an open network structure made of continuous filament fiberglass preferably a network which is neither woven together, nor knit together, nor held together by adhesive. It preferably consists of a non-woven fiberglass scrim prepared for example as described in U.S. Pat. No. 3,728,195 of about 0.1 to 1 ounces per square yard. Most preferably the fiberglass network weighs about 0.5 ounces per square yard. The fiberglass yarn is in the range of 1800–2400 denier.

The non-woven layer of polyester staple fibers has a weight of approximately 0.5 ounces per square yard with the fibers having a length of 1½" to 3" and is wet laid to form the mat. The stitch or knit yarn secures the second layer to the scrim fabric on a Malimo or weft insertion machine with stitch through capability and provides 12 stitches per inch in the machine or warp direction of the reinforcing sheet. The stitch yarn, in the preferred form of the invention is, 150 denier, 64 filament textured polyester yarn knit in a tricot stitch of 1-0/1-2.

The second layer of this invention is a mat or network which, by providing partial or full coverage in the openings or "windows" between the yarns of the first layer, enables the bituminous material to form a continuous sheet on the composite. The second layer preferably is a mat which consists essentially of polyester filaments, though other synthetic mats such as mats of nylon or combinations of polyester and nylon, may be used. ("Mat" as used herein refers to an entangled mass of filaments, preferably structures which are wet laid or spun bond.) The mat is preformed, preferably wet laid, and lightweight relative to mats used in the prior art without reinforcement in bituminous roofing membranes. More specifically, "lightweight" means a mat weighing about 0.1 to 4 ounces per square yard, most preferably about 0.5 ounces per square yarn. By "preformed" is meant a mat which has been fabricated into the mat form before it is combined with the scrim fabric.

As described above, the reinforcing fabric after it has been run through the Malimo or weft insertion machine to stitch the non-woven mat to the scrim fabric, is either taken up on a roll and supplied or supplied in a continuous manner to a tank of bituminous material to form the roofing membrane as described above.

Obviously the herein described roofing member is lightweight, flexible, easily manufactured at a minimal cost and can be easily handled after formation for application to a roof.

Although the preferred embodiment of the invention has been described it is contemplated that changes may be made within the scope of the invention and it is desired that the invention be limited only by the scope of the claims.

What is claimed is:

1. A roofing membrane comprising: a reinforcing fabric saturated with bituminous material; the reinforcing fabric having a first layer of fiberglass scrim fabric and a second layer of non-woven polyester mat stitched thereto.

2. The membrane of claim 1 wherein said layers are stitched together with a textured polyester continuous filament yarn.

3. The membrane of claim 2 wherein the layers are stitched together with a tricot stitch.

4. The membrane of claim 3 wherein said second layer weighs approximately 0.5 ounces per square yard.

5. The membrane of claim 4 wherein the number of stitches per inch are 12.

* * * * *